J. B. COMPTON.
Churn-Dashers.

No. 143,559.  Patented Oct. 14, 1873.

Witnesses.  Inventor.

UNITED STATES PATENT OFFICE.

ISRAEL B. COMPTON, OF SEWARD, NEBRASKA.

IMPROVEMENT IN CHURN-DASHERS.

Specification forming part of Letters Patent No. 143,559, dated October 14, 1873; application filed January 4, 1873.

*To all whom it may concern:*

Be it known that I, ISRAEL B. COMPTON, of Seward, State of Nebraska, have invented an Air Tubular Churn-Dash, of which the following is a specification:

My invention is an improvement in air tubular churn-dashes, the object being to facilitate the operation of the dash by providing it with air-tubes, through which air is conveyed beneath the dash, thus preventing suction, which would otherwise retard its return after being forced down to the bottom of the churn. A further object which my invention has in view is to quicken the separation of the butter from the other parts composing the cream. This object is attained by covering the holes in the dash with short upright tubes, which are surmounted by, and open into, horizontal tubes, open at both ends, and radiating from a large central tube, which forms the lower part of the churn-staff. On pressing the dash down the cream is forced up through the upright tubes, and thence through the horizontal tubes, and so out toward the sides of the churn. The increased agitation thus given to the cream greatly quickens the "bringing" of the butter, and reduces the labor of the churner.

Figure 1:
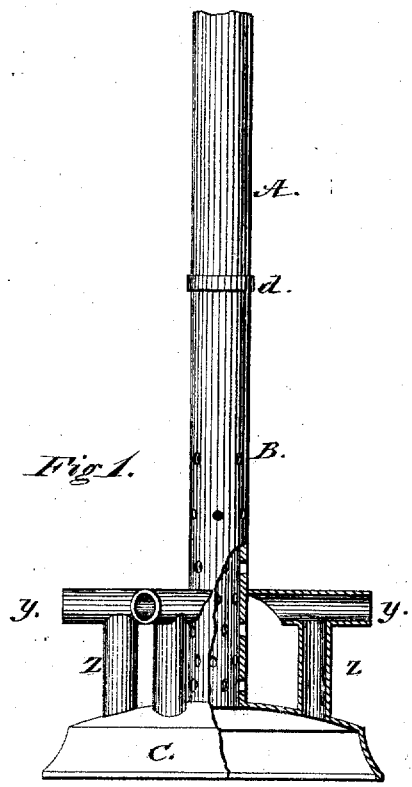
Figure 2:
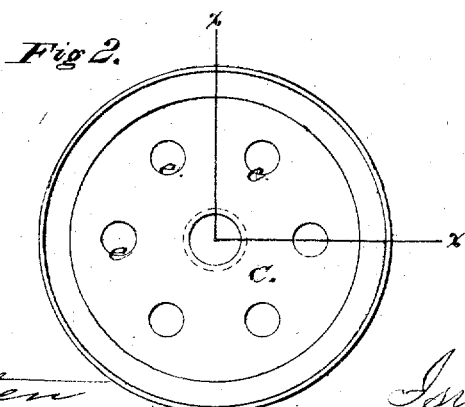

Figure 1 is an elevation of dash, showing a section through line $x\ x$. Fig. 2 is a view of bottom of dash.

In the drawing, A represents the churn-staff, which may be formed of wood as far as the ring $d;$ below this it must consist of a tube perforated with small holes, as shown in the drawing. This tube opens through the bottom of the dash. When the dash is pressed down the cream rises in this tube, and is forced through the perforations. On the return of the dash, air enters the tube through the small holes and expels the cream. This arrangement serves to agitate the cream, and also to lessen the labor of churning. Z represents the short upright tubes, soldered over openings $e$ in dash C. Y are the horizontal tubes surmounting tubes Z. As shown in the drawing, these tubes allow a free passage for the cream as the dash is forced down. Tubes Y being open at both ends, the cream which rises in tubes Z is expelled through tubes Y, and falls over the top of the dash, and then finds its way to the bottom of the churn through holes in the dash, and through the space between it and the sides of the churn. The horizontal tubes radiate from the central tube B, and are partly supported by it, as represented in the drawing. The under sides of tubes Y, at the ends next to tube B, are cut away so that there is no obstruction to the free expulsion of the cream from the tubes.

The device herein described not only serves to thoroughly agitate the cream, and thus shorten the work of bringing the butter, but also, by throwing the cream as it comes from the tubes to the sides and center of the churn, prevents splashing and waste. The short upright and horizontal tubes also serve as air-passages to convey air under the dash and prevent suction, being auxiliary for this purpose to main tube B.

What I claim as new, and desire to secure by Letters Patent, is—

The perforated tubular staff B open at its lower end, in combination with the horizontal tubes Y and upright tubes Z opening under the dash C, the whole designed to furnish passages for the air under the dash, substantially as and for the purpose specified.

I. B. COMPTON.

Witnesses:
R. S. NORVAL,
WM. LEESE.